United States Patent
Kasiviswanathan et al.

(10) Patent No.: US 10,924,381 B2
(45) Date of Patent: Feb. 16, 2021

(54) SYSTEM AND METHOD OF PROCESSING IN-PLACE ADJACENCY UPDATES

(71) Applicant: Arista Networks, Inc., Santa Clara, CA (US)

(72) Inventors: Venkitraman Kasiviswanathan, San Ramon, CA (US); Sriram Sellappa, Santa Clara, CA (US); Asang Kamalakar Dani, Nagpur (IN)

(73) Assignee: Arista Networks, Inc., Santa Clara, CA (US)

( * ) Notice: Subject to any disclaimer, the term of this patent is extended or adjusted under 35 U.S.C. 154(b) by 379 days.

(21) Appl. No.: 14/626,442

(22) Filed: Feb. 19, 2015

(65) Prior Publication Data

US 2016/0248657 A1 Aug. 25, 2016

(51) Int. Cl.
*H04L 12/751* (2013.01)
*H04L 12/741* (2013.01)

(52) U.S. Cl.
CPC .............. *H04L 45/02* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 5,867,501 A * | 2/1999 | Horst | G01R 31/31727 370/474 |
| 7,242,678 B2 * | 7/2007 | O'Neill | H04W 8/087 370/349 |
| 7,496,650 B1 * | 2/2009 | Previdi | H04L 45/028 370/229 |
| 9,819,587 B1 | 11/2017 | Tracy et al. | |
| 10,135,734 B1 | 11/2018 | Singh et al. | |
| 10,708,222 B1 | 7/2020 | Bean | |
| 2002/0062388 A1 | 5/2002 | Ogier et al. | |
| 2004/0196827 A1 * | 10/2004 | Xu | H04L 41/00 370/352 |
| 2004/0205215 A1 * | 10/2004 | Kouvelas | H04L 12/18 709/231 |
| 2007/0047463 A1 * | 3/2007 | Jarvis | H04L 45/7457 370/254 |
| 2007/0150614 A1 | 6/2007 | Ramachandran et al. | |
| 2011/0161489 A1 * | 6/2011 | Bhatt | H04L 45/245 709/224 |
| 2011/0222539 A1 * | 9/2011 | Grosser | H04L 45/60 370/392 |
| 2011/0320632 A1 | 12/2011 | Karino | |

(Continued)

*Primary Examiner* — Kevin C. Harper
*Assistant Examiner* — Derrick V Rose
(74) *Attorney, Agent, or Firm* — Haley Guiliano LLP

(57) ABSTRACT

A method and apparatus of a network element that processes changes to forwarding information is described. In an exemplary embodiment, the network element receives an indication of a change to a network topology of the network. The network element forwarding information includes a first plurality of prefixes and a plurality of adjacencies and each of the first plurality of prefixes references one of the plurality of adjacencies. In addition, in response to receiving the indication of the change to the network topology, the network element identifies a change to the plurality of adjacencies. Furthermore, the network element updates, in-place, the plurality of adjacencies in-place with the change to the plurality adjacencies.

8 Claims, 13 Drawing Sheets

(56) References Cited

U.S. PATENT DOCUMENTS

| | | |
|---|---|---|
| 2012/0323381 A1 | 12/2012 | Yadav et al. |
| 2014/0153573 A1 | 6/2014 | Ramesh et al. |
| 2014/0156667 A1 | 6/2014 | Kapadia et al. |
| 2014/0219279 A1 | 8/2014 | Gross et al. |
| 2015/0098470 A1 | 4/2015 | Sun |
| 2015/0124826 A1* | 5/2015 | Edsall ................. H04L 12/4633 370/392 |
| 2015/0163140 A1 | 6/2015 | Rovner et al. |
| 2015/0326476 A1* | 11/2015 | Ye ........................... H04L 47/12 370/235 |
| 2017/0142013 A1 | 5/2017 | Zhang |
| 2017/0195181 A1 | 7/2017 | Birmiwal et al. |
| 2017/0214618 A1 | 7/2017 | Banerjee et al. |
| 2017/0310589 A1 | 10/2017 | Tambakuwala et al. |
| 2018/0109454 A1 | 4/2018 | Holmberg |

* cited by examiner

SYSTEM AND METHOD OF PROCESSING IN-PLACE ADJACENCY UPDATES

FIELD OF INVENTION

This invention relates generally to data networking, and more particularly, to handling adjacency changes for equal cost path forwarding.

BACKGROUND OF THE INVENTION

Any event that changes a network topology of a network can lead a lot of central processing unit time of a network element to process these changes (e.g., link up or down of the same or other network element, advertisements of new routes, withdrawal of routes). Furthermore, the time it takes for the network element to converge the forwarding information in response to the network topology change can be longer that what is desired by a network operator.

Furthermore large equal-cost multi-path routing (ECMP) routes (64-way, 128-way, and higher) have become the norm. The larger ECMP routes further compound the amount of time it takes for a network element to converge on the forwarding information. This combined with very fast convergence has become a requirement for data centers. Moreover, customers have come to expect very quick convergence and small CPU utilization of the network element, especially when customers performed planned maintenance (cost-out a router and then perform maintenance task on it and then cost-in the router seamlessly) or link down events.

A network element will also track adjacencies for next hops. An adjacency maps a subnet to a next hop interface and next hop network element. Typically, the number of routes stored can be very large in number, whereas adjacencies (also known as Forward Equivalence Classes (FECs)) are much smaller in number. Thus, it can be desirable to do operations on the order of the number of adjacencies rather than processing all of the routes known to a network element.

SUMMARY OF THE DESCRIPTION

A method and apparatus of a network element that processes changes to forwarding information is described. In an exemplary embodiment, the network element receives an indication of a change to a network topology of the network. The network element forwarding information includes a first plurality of prefixes and a plurality of adjacencies and each of the first plurality of prefixes references one of the plurality of adjacencies. In addition, in response to receiving the indication of the change to the network topology, the network element identifies a change to the plurality of adjacencies. Furthermore, the network element updates, in-place, the plurality of adjacencies in-place with the change to the plurality adjacencies.

In another embodiment, the change in the network is a prefix advertisement. In this embodiment, the network element performs an in-place update of the plurality of adjacencies by determining a next hop list for a prefix included in the prefix advertisement. If the next hop list matches one of the plurality of adjacencies, the network element adds the prefix to a next hop list cache.

In a further embodiment, the change in the network topology is a peer down. In this embodiment, the network element performs an in-place update of the plurality of adjacencies by determining a next hop for the peer. The network element further records that the next hop is down and deletes an entry in an adjacency table corresponding to the next hop.

In another embodiment, the change in the network topology is a peer up. In this embodiment, the network element performs an in-place update of the plurality of adjacencies by receiving a notification of a new peer. The network element further receives a second plurality of prefixes. In addition, the network element computes a second next hop list from each of the plurality of prefixes. Furthermore, the network element performs a divergence detection between the second next hop list and a first next hop list computed from the first plurality of prefixes. The network element additionally, if the first and second next hop lists are not diverged, updates the plurality of adjacencies.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
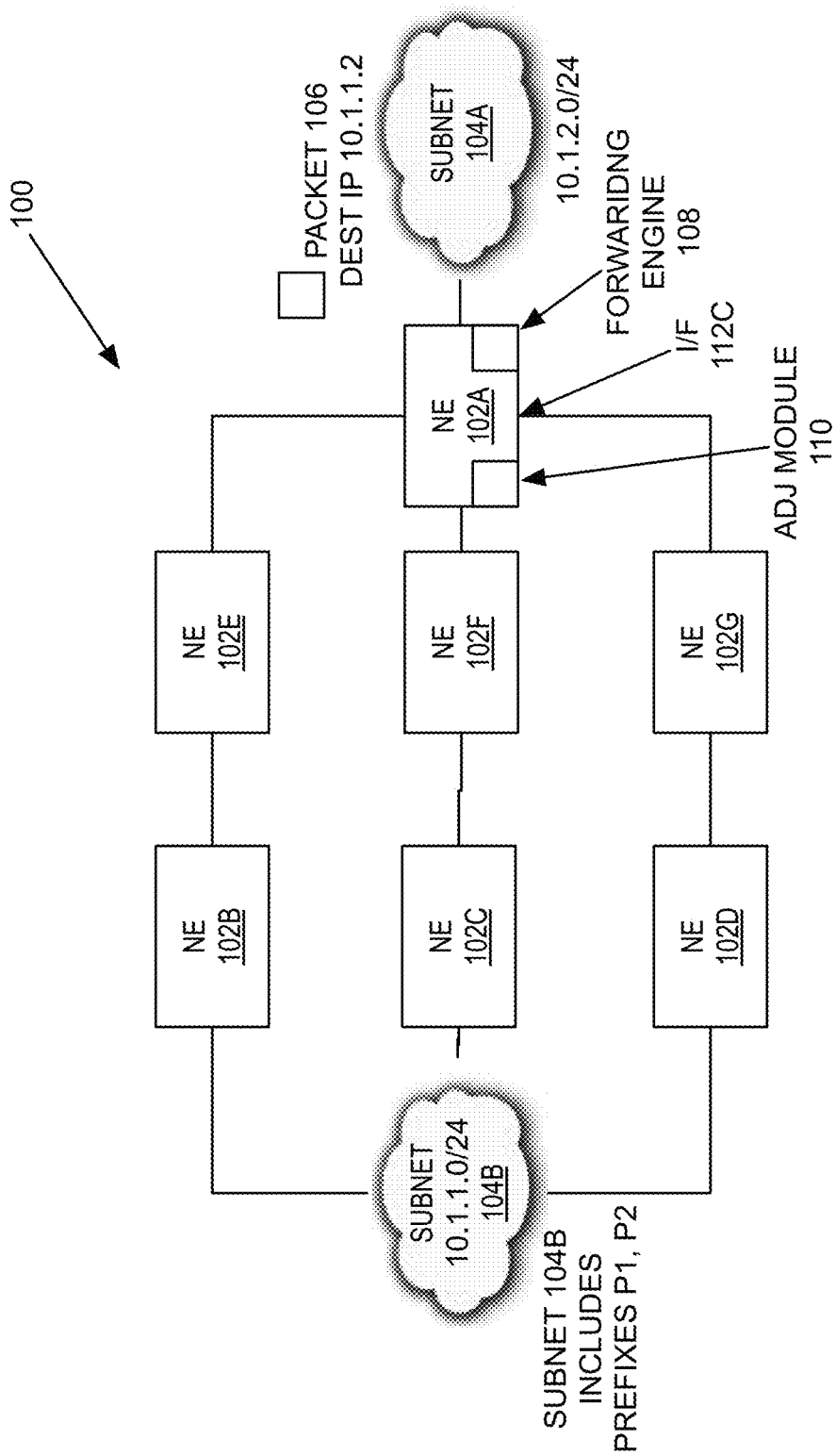
FIG. 1 is a block diagram of one embodiment of a system that includes different paths between different subnets.

A method and apparatus of a device that processes changes to forwarding information is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that processes changes to forwarding information is described. In one embodiment, the device performs in-place adjacency updates in response to changes in the network topology associated with the device. In this embodiment, the device includes forwarding information in a longest prefix match (LPM) table and an adjacency table. The LPM table includes prefixes that this network element knows about and the adjacency table has adjacencies that are obtained from the forwarding information base (FIB) created by the control plane of the network element. Furthermore, each of the entries in the LPM table references an entry in the adjacency table. The adjacency table is further described below. The LPM table can be much larger than the adjacency table, because the LPM table includes the prefixes known by the network element (which can run into the tens of thousands or greater) and the adjacencies table is one the order of the number interfaces of the network element (which can be on the order of dozens).

Because the LPM table is much larger than the adjacency, changes to the network topology table can be handled more efficiently in the adjacency table than the LPM table. In one embodiment, the network topology can change due to new prefixes being advertised and a network element coming up or going down.

In one embodiment, the device quickly shrinks adjacencies in the device hardware when a link goes down or when link-level protocols like BFD indicate loss of connectivity. For example and in one embodiment, the hardware driver in the device operating system detects these events quickly, iterates the adjacency entries into the adjacency table, and removes the link, and the attached neighboring routers address on that link. If the route happens to be an ECMP, the adjacency entry corresponding to this ECMP would be shrunk to not contain the link that just went down. In one embodiment, by processing the adjacency entries instead of the LPM entries, the device has a quick convergence of the forwarding information at the hardware level and the affected downlink will not be used for forwarding traffic.

In another embodiment, the device can also quickly shrink adjacencies in control plane for protocols, when the link goes down or when link-level protocols like BFD indicate loss of connectivity. The device control plane shares forwarding information with the forwarding engine(s) of the device. In one embodiment, this forwarding information can include a number of routes that use the same adjacency. In this embodiment, when the device control plane protocol detects link down, the device control plane can iterate through the adjacencies and shrink them in a similar fashion. The control plane protocols can use this same technique to handle peer router down events to shrink ECMP adjacencies for prefixes received from that peer. By shrinking the adjacencies, the device control plane quickly converges the forwarding information and can easily update other upstream protocol peers about the decreased bandwidth towards the destination prefix.

In one embodiment, the above two ideas can be applied to link-down or peer-down events. When a new link comes up and the device control plane has new protocol peers advertising the same prefixes to us (e.g., the ECMP is now growing for this prefix), tracking advertisements to the same prefix and updating the adjacency structure in the protocols. As is discussed below is a method to perform in-place adjacency replacements for link-up/session-up scenarios.

FIG. 1 is a block diagram of one embodiment of a system 100 that includes different paths between different subnets. In FIG. 1, the system 100 includes network elements 102A-G that are coupled to subnets 104A-B. In one embodiment, each of the subnets is represented by one or more prefixes. In one embodiment, subnet 104A-E is a portion of the network. For example and in one embodiment, a subnet is a network portion defined by a range of network addresses, such as 10.1.2.0/24. In this example, subnet 104A is represented by the network address 10.1.2.0/24, which gives a range of addresses from 10.1.2.1-10.1.2.255 for subnet 104C. A subnet can be as little as one address or may have thousands or even millions of addresses. A prefix for a subnet is a network address that includes one or more actual addresses. For example and in one embodiment, a prefix can be one address (e.g., 168.1.1.1) or a range of two or more addresses (e.g., 168.1.1.2/31 or 168.1.1.0/24).

In one embodiment, each network element 102A-G is a network element that allows network access from one subnet to another. For example and in one embodiment, a network element 102A-G can be a router, switch, or another type of network element that allows network access from one subnet to another. In one embodiment, the network element can be a virtual or physical network element.

As illustrated in FIG. 1, subnets 104A-B are coupled via network elements 102A-G. In FIG. 1, there can be multiple paths between the two subnets 104A-B. For example and in one embodiment, there are three different paths between subnets 104A-B and subnet 104A. The first path is through network elements 102A, 102E, and 102B. The second path is via network elements 102A, 102F, and 102C. The third path is via network elements 102A, 102G, and 102D. In this example, each of the different paths will have a cost associated for forwarding a packet. These costs can be the same or different. If the costs are the same, and network element can choose to send a packet using the same or different paths. For example and in one embodiment, if a packet 106 was being sent from subnet 104A with the destination Internet protocol (IP) address of 10.1.1.2 in subnet 104B, the network element 102A can have a choice as to which interface would be used to transmit packet 106. Network element 102A can either send the packet 106 via network elements 102E-G. Each of these paths will eventually lead to subnet 104B. If the paths have equal cost, it does not matter which path is chosen as the packet will arrive at approximately the same time.

Because there can be multiple equal cost paths to a subnet, the network element 102A can use equal-cost multi-path routing (or equal-cost path (ECMP)). As described above, ECMP is a routing strategy where next-hop packet forwarding to a single destination can occur over multiple "best paths" which tie for top place in routing metric calculations. Many different routing protocols support ECMP (e.g., Open Shortest Path First (OSPF), Intermediate System to Intermediate System (ISIS), and Border Gateway Protocol (BGP)). ECMP can allow some load balancing for data packets being sent to the same destination, by transmitting some data packets through one next hop to that destination and other data packets via a different next hop. The network element 102A that uses ECMP makes ECMP decisions for various data packets of which next hop to use based on which traffic flow that data packet belongs to. In one embodiment, the network element 102A determines whether to send packets, such as packet 106, via next hop network elements 102E-G to subnet 104B. In FIG. 1, subnet 104B has equal cost paths from subnet 104A.

In FIG. 1, network elements 102B-D are protocol peers to network element 102A. In one embodiment, a protocol peer is a pair of network elements (e.g., network elements 102A-B, 102A & C, and 102A & D) that form a control plane protocol interconnection to exchange routes (or prefixes) known to each other. The peers may or may-not be directly connected to each other. For example and in one embodiment, for BGP, it is possible that peer routers have other routers separating them. In this example, network elements 102A-B can establish BGP peering without being directly connected (e.g. network element 102E is in-between network elements 102A-B). Alternatively, protocol peers can be directly connected to each other. For example and in one embodiment, network elements 102B-D are each BGP peers with network element 102A, network elements 102E-G are the respective intermediates for those protocol peers, respectively. In this example, the network elements 102B-D would advertise reachability to prefixes of subnet 104B known to the network elements 102B-D. Thus, as far as network element 102A is concerned, the prefixes in subnet 104B are reachable via network elements 102B-D. In this example, the three different routes with three different BGP next hops is an ECMP route. This can be represented as three different BGP next hops to one subnets with prefix P:

P➔ 102B, 102C, 102D

However, in the forwarding information base (FIB), the network element 102A programs adjacencies in terms of immediately connected routers. In one embodiment, the FIB is programmed in hardware. Thus, the network element 102A further resolves network elements 102B-D to its immediately connected routers and program that information into the FIB. Further resolving a peer to a nearest neighbor is called recursive resolution. Thus, the above route becomes: P→102E, 102F, 102G. While in one embodiment, the above information is illustrated with one prefix, in alternate embodiment, a FIB and RIB could contain tens, hundreds, thousands, or even more prefixes for that subnet 104B. In addition, a FIB and RIB can also include prefix entries for other subnets as well.

In one embodiment, the protocol table (also know as RIB—Routing information base) would contain the un-resolved next hop (e.g., 102B-D) and the FIB would contain the recursively-resolved next hops in the adjacency (e.g., 102E-G).

As described above and in one embodiment, the network element 102A further includes a forwarding engine 108. In one embodiment, the forwarding engine 108 includes a forwarding table (described further below) that the forwarding engine 108 uses to determine which interfaces 112A-C should be used to transmit the packet 106. In one embodiment, the forwarding engine 108 performs an address lookup using the forwarding table for the packet destination address to determine a next hop for the packet. In one embodiment, the forwarding engine includes a LPM table that matches prefixes to addresses and an adjacency table that lists next hops. The LPM table includes prefix entries (e.g., a prefix is a range of one or more IP addresses) and a corresponding entry in the adjacency table. The content of packet 106 has a destination IP address that matches to one of the prefixes in the LPM table. The process of looking up the destination IP address in packet 106 involves finding out which prefix to best use, in order to reach the destination IP address. Once the prefix (one from the many in the LPM table) is determined, the adjacency information (next hop router and interface) corresponding to that prefix is obtained. The LPM and adjacency tables are further described below.

In one embodiment, a similar concept can be used for maintaining the adjacency table. In this embodiment, the adjacency module 110 maintains a next hop list cache 114. An NHLIST is a data structure comprising of protocol announced (e.g., BGP announced or some other protocol that announces peers) next hops for a given prefix. For example and in one embodiment, from the example described above, the prefix P was advertised by two BGP peers, the NHLIST for prefix P would be (102B, 102C, 102D). This NHLIST is further decomposed (by recursive-resolution) to obtain a result of (102E, 102F, 102G). If this decomposed result can be saved against this NHLIST, then any subsequent prefix, say P1, which gets advertised by the same set of peers and which have the same protocol NHLIST, can make use of the cached result above and the adjacency module 110 does not have to recompute the recursively resolved next hops. So, for example, if P1 were to have a NHLIST of (102B, 102C, 102D), the protocol would simply have to lookup against the cache and obtain the cache entry (102E, 102F, 102G) and program that to the FIB. While in one embodiment, a three-way ECMP as illustrated in FIG. 1 may not have significant computation saving, as ECMP groups get larger and larger, the computation saving increase. For example and in one embodiment, the computation savings are significant if there is a 256-way ECMP path with 50,000 prefixes sharing the same NHLIST.

When the network topology changes, the adjacency needs to be updated accordingly. For example, when the network topology changes due a new next hop for subnet being discovered, a peer going down, or a peer going up, the forwarding information needs to be updated due to this change. Previously, for each notification of the network topology change, the network element deletes the current forwarding information and rebuilds the forwarding information from scratch. In addition, for each topology change, the network element will advertise the change through a routing protocol running on the network element. If there are a lot of topology changes, this rebuilding and advertising of can create a lot of churn in the network element as the network element makes the changes and advertises those changes to other network elements or peers.

Instead of rebuilding the forwarding information from scratch, the network element 102A updates the forwarding information based on the types of topology change that is detected by the network element 102A. For example and in one embodiment, if the topology change is new prefix advertisement, the network element 102A determines the next hop list for the new subnet prefix and updates the adjacency table.

Figure 2:
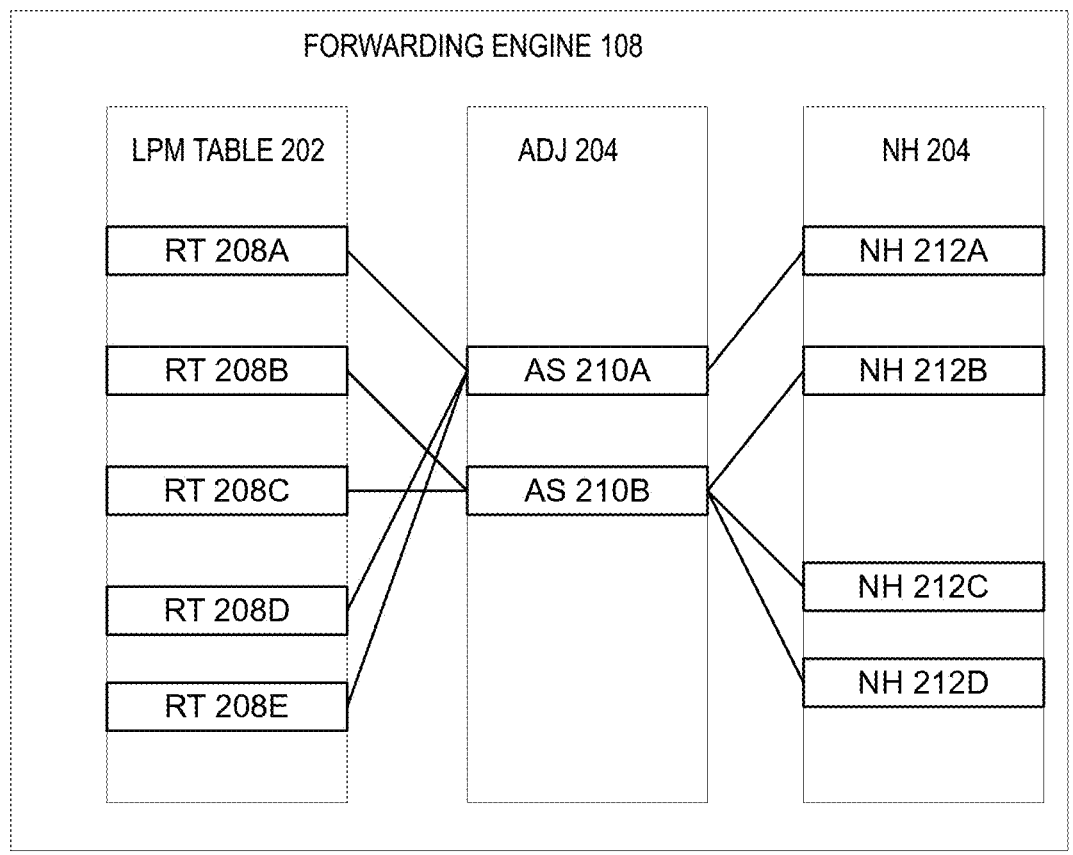
FIG. 2 is a block diagram of one embodiment of a forwarding engine that includes a longest prefix match table and an adjacency table.

FIG. 2 is a block diagram of one embodiment of a forwarding engine 108 that includes a longest prefix match (LPM) table 202 and an adjacency table 204. In FIG. 2, a network element receives an incoming packet from the wire. The incoming packet has a destination Internet Protocol (IP) address. The network element hardware looks up an internal table for the LPM table 202 on the incoming packets IP address. This yields an index into the adjacency table 204. The adjacency table 204 includes information about how to send the packet out of the network element. In one embodiment, the adjacency table 204 includes the egress interface on which the packet has to be sent and the next hop network element (e.g., an attached neighboring network element) to which the packet has to be sent in order for it to finally reach its destination network. The LPM table 202 includes prefixes that this network element knows about and the adjacency table 204 has adjacencies that are obtained from the FIB created by the control plane of the network element. The adjacency table 204 includes information to reach an immediate neighbor (e.g., a network element that is attached directly to this router via the network).

For example and in one embodiment, the LPM table includes routes 208A-E. In this example, each of the routes is for a prefix. Each of the routes in the LPM table 202 references one of the adjacency sets 210A-B in the adjacency table 204, which in turn references one or more next hops 212A-D. In one embodiment, an adjacency set 210A-B is a set of one or more adjacencies for a prefix. In addition, each adjacency set 210A-B includes a size of this set. As illustrated in FIG. 2, routes 208A, D, and E reference adjacency set 210A and routes 208B-C reference adjacency set 210B. In addition, adjacency set 210A references next hop 212A. In this example, adjacency set 210A has one next hop. Furthermore, adjacency set 210B references next hops 212B-D, where this adjacency set is a 3-way ECMP. In this example, a network element would use the next hop 212A in adjacency set 210A to transmits packets with destination addresses for a prefix in one of the routes 208A, D, and E. Furthermore, the network element would use one of the next hops 212B-D in adjacency set 210B to transmits packets with destination addresses for a prefix in one of the routes 208B-C. Each next hop entry 212A-D includes an outgoing interface of the adjacent network element, such as the MAC address of the adjacent network element.

In one embodiment, the LPM table 202 can get large because the network element learns a large number of prefixes. On the other hand, the adjacency table can be much smaller because the adjacency table is on the order of the number of directly attached neighboring network elements (which are limited by the number of interfaces on this network element). In addition, the next hop table is equal to the number of active interfaces on the network element. In this embodiment, it is desirable that for a network topology event, for the network element work in the order of the number of adjacencies as opposed to the number of prefixes, since the number of adjacencies can be up to several orders of magnitude smaller. For example and in one embodiment, the number of adjacencies can be on the order of 50-100 and the number of prefixes can be 50,000 or greater. In one embodiment, an adjacency for a single route includes the next hop information (e.g., one interface and peer router address) or an adjacency can be an ECMP route with multiple interfaces and peer router addresses in them.

In one embodiment, a beneficial use of the indirection in the adjacency table allows a network element to dynamically resize a particular adjacency set, without changing the LPM entries. In addition, by retaining the same reference from the LPM RT entry to the adjacency table, and allocating a new consecutive block (of the required size) in the next hop table, the network element updates the adjacency set table entry. This allows for the in-place adjacency updates without needing to manipulate the routes in the LPM table. In this embodiment, the notion of in-place adjacency updates provides efficiency in the control plane, as the network topology updates are propagated concisely from the routing daemon to the hardware driver.

Figure 3:
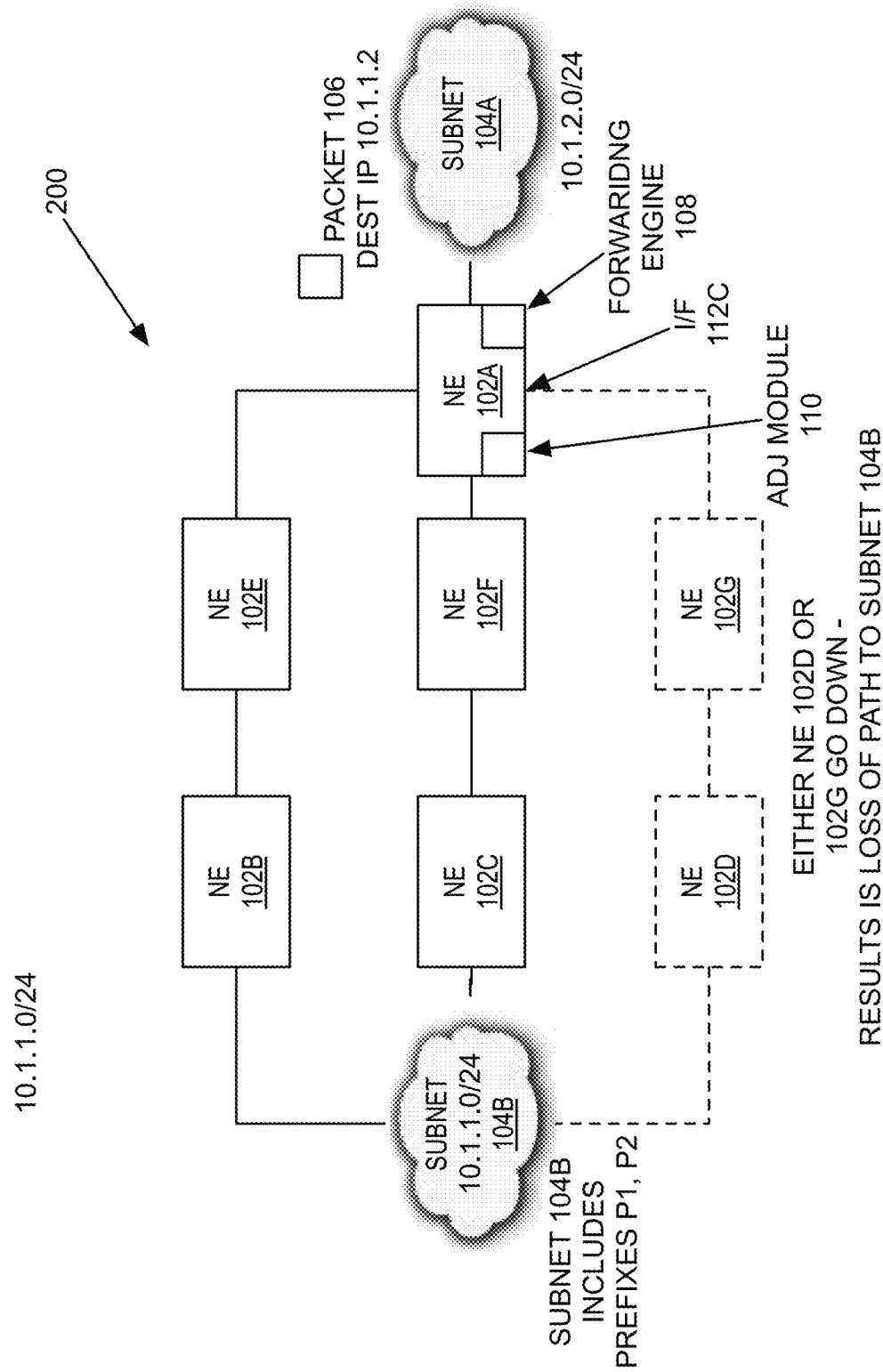
FIG. 3 is a block diagram of one embodiment of a system that includes different paths between different subnets where a network element is down.

FIG. 3 is a block diagram of one embodiment of a system 300 that includes different paths between different subnets where a network element is down. In FIG. 3, subnets 104A-B are coupled via network elements 102A-G. In FIG. 1, there can be multiple paths between the two subnets 104A-G. For example and in one embodiment, there are three different paths between subnet 104B and subnet 104A. The first path is through network elements 102A, 102E, and 102B. The second path is via network elements 102A, 102F, and 102C. The third path is via network elements 102A, 102G, and 102D. In this example, each of the different paths will have a cost associated for forwarding a packet. As in FIG. 1, these costs can be the same or different. If the costs are the same, the network element can choose to send a packet using the same or different paths. Network element 102A can either send the packet 106 via network elements 102E-G, where each of these paths will eventually lead to subnet 104B. If the paths have equal cost, it does not matter which path is chosen as the packet will arrive at approximately the same time.

Furthermore, in FIG. 3, the third path is disrupted, because either the network element 102D or 102G goes down. In one embodiment, network element 102D can go down due to a link being cut or disconnected between network element 102D and 102G, power loss, network element reset, maintenance, software upgrade, or another reason that causes a network element to go down or lose connectivity. In another embodiment, network element 102G can go down due to a link being cut or disconnected between network element 102G and 102A (or 102D), power loss, network element reset, maintenance, software upgrade, or another reason that causes a network element to go down or lose connectivity. For example and in one embodiment, the network element 102A can use one or more protocols to determine link up or down (e.g., Bidirectional Forwarding Detection (BFD)). In this embodiment, because network element 102G has gone down, the route in the RIB and corresponding adjacencies in the FIB need to be updated. For example and in one embodiment, because network element 102G goes down, the paths to subnets 104B via network element 102G or network element 102D are no longer valid. In one embodiment, instead of recalculating the RIB and FIB, the network element 102A will update the adjacencies in the FIB for the routes in the RIB.

In one embodiment, the network element 102A updates the adjacency table by shrinking entry to not contain the link that just went down. For example and in one embodiment, network element 102A shrinks the adjacency entry for network element 102G included in routes to subnet 102B through network element 102G. Updating the adjacency table for a link/peer down is further described in FIG. 6 below.

Figure 4:
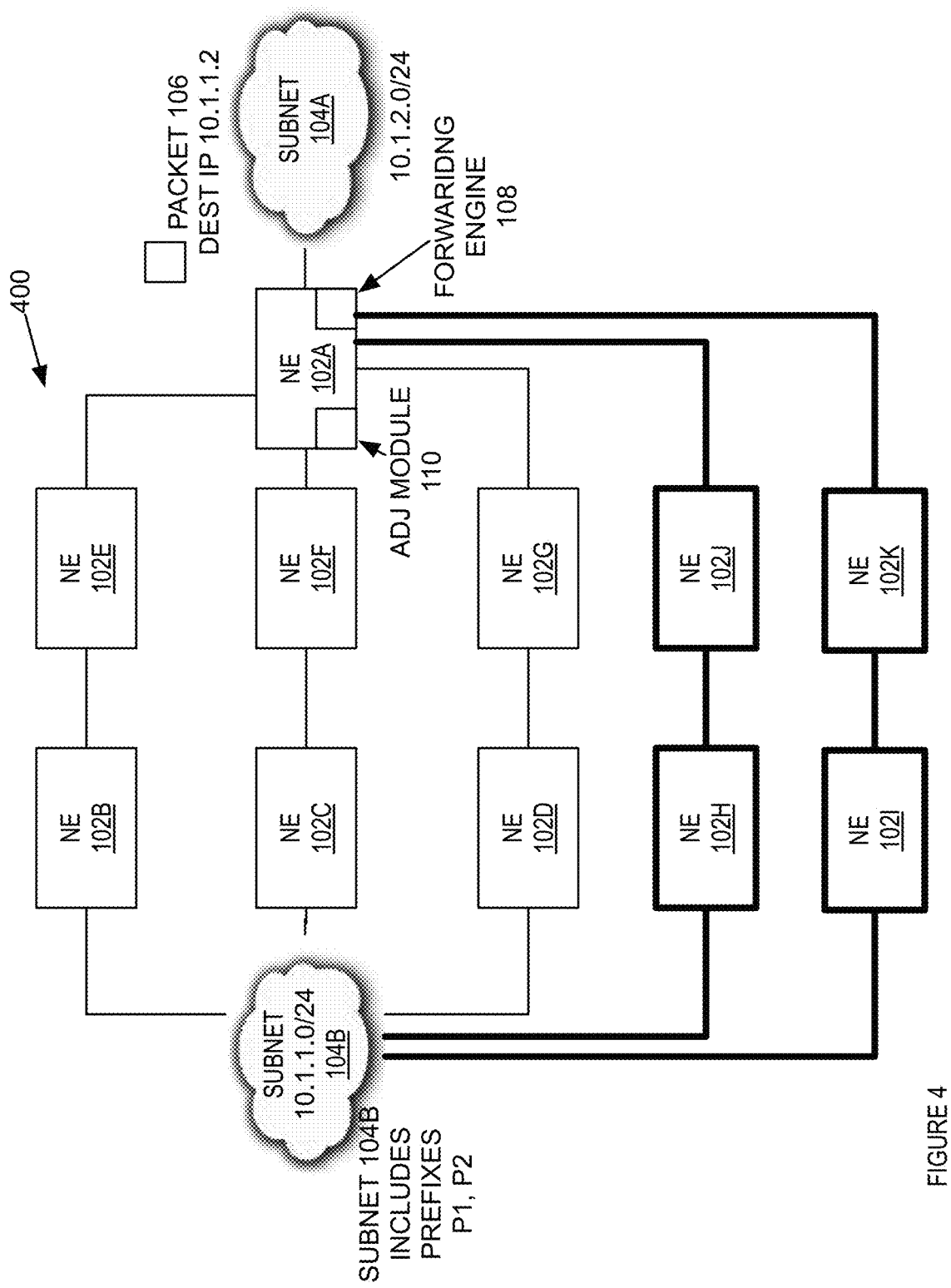
FIG. 4 is a block diagram of one embodiment of a system that includes different paths between different subnets where a network element is brought up.

FIG. 4 is a block diagram of one embodiment of a system 400 that includes different paths between different subnets where a network element is brought up. In FIG. 4, subnets 104A-B are coupled via network elements 102A-G. In FIG. 1, there can be multiple paths between the different subnets 104A-G. For example and in one embodiment, there are three different paths between subnet 104A and subnet 104B. The first path is through network elements 102A, 102E, and 102B. The second path is via network elements 102A, 102F, and 102C. The third task is via network elements 102A, 102G, and 102D. In this example, each of the different paths will have a cost associated for forwarding a packet. As in FIG. 1, these costs can be the same or different. If the costs are the same, the network element can choose to send a packet using the same or different paths. Network element 102A can either send the packet 106 via network element 102E-G. Each of these paths will eventually lead to subnet 104B. If the paths have equal cost, it does not matter which path is chosen, as the packet will arrive at approximately the same time.

In addition, in FIG. 4, network elements 102J-K comes up on interfaces of network element 102A. Network element 102J further couples to network element 102H, which in turn couples to subnet 104B. In addition, network element 102K further couples to network element 102I, which in turn couples to subnet 104B. The addition of these network elements 102H-I to the network 400 allows for two additional paths between subnets 104A-B. In this embodiment, there is a path between the subnets 104A-B via network elements 102A, 102J, and 102H. There is another path between the subnets 104A-B via network elements 102A, 102K, and 102I. In addition, and in this embodiment, network elements 102H-I are BGP peers with network element 102A. This means that network elements 102I-J will announce prefixes to network element 102A. In addition, because network elements 102H-I are coupled to the same subnet 104B as network elements 102B-D, network elements 102H-I will advertise the same routes that have been advertised by network elements 102B-D. In one embodiment, bringing up of network elements 102H-I can lead to many pre-existing prefixes being announced to network element 102A (e.g., one, dozens, hundreds, or higher). In one embodiment, access network 102A updates the next hop cache list by creating a new NHList for the prefix represented by the route without changing the FIB and performing divergence detection and in-place adjacency replace. The next hop cache list update is further discussed in FIG. 7 below.

Figure 5:
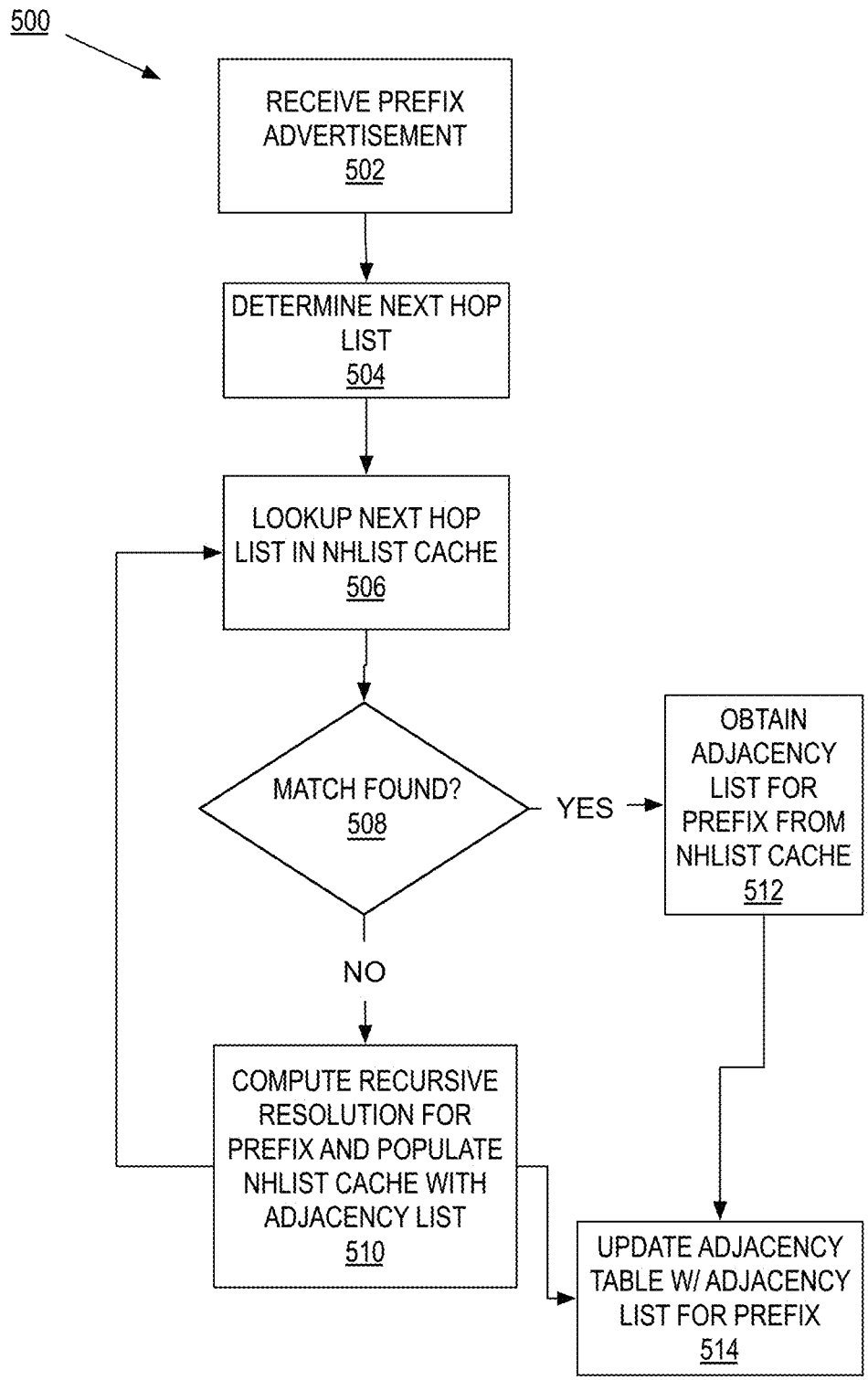
FIG. 5 is a flow diagram of one embodiment of a process to add new prefix to an adjacency table.

FIG. 5 is a flow diagram of one embodiment of a process 500 to add a new adjacency for a received prefix to an adjacency table. In one embodiment, an adjacency module performs process 500 to add the new adjacency to the adjacency table, such as adjacency module 110 as described in FIG. 1 above. Alternatively, process 500 can be used to shrink an adjacency when a BGP peer goes down. In FIG. 5, process 500 begins by receiving a path for a prefix advertisement at block 502. In one embodiment, the prefix advertisement is a prefix announced by a peer such as a BGP peer. For example and in one embodiment, the prefix advertised by a BGP peer, such as network elements 102B-D for network element 102A as described in FIG. 1 above. In this example, the peer is a far removed peer, meaning the peer is not a network element that is directly connected to the network element receiving the prefix advertisement. In order for the prefix to be stored in the forwarding table, the immediately connected next hop network element will need to be resolved for this peer using the recursive resolution described above, because the peer is not immediately connected to the network element that received the peer advertisement.

At block 504, process 500 determines the next hop list for the prefix, where each next hop is distant for the network element receiving the prefix advertisement. In one embodiment, the prefix may have one or more next hops. If the prefix has more than one next hops, this prefix is associated with an ECMP route to that prefix. In one embodiment, process 500 determines the next hop list by looking up the RIB for this prefix and by adding the BGP protocol-advertised next hop from each BGP peer that has sent this prefix. In one embodiment, if a BGP peer goes down, it is equivalent if a withdrawal of prefixes advertised by the peer that went down. In this embodiment, process 500 can determine a next hop list that is smaller (e.g., one next hop smaller).

In one embodiment, the next hop list from block 504 includes the list of peers that have advertised this prefix. In order the update the adjacency table with this information, process 500 resolves the next hop list to an adjacency list for the prefix. For example and in one embodiment, network element 102A performs process 500 and receives a prefix, $P_1$, from the peer network element 102D. In this example, network element 102B-C are known next hops for $P_1$. Process 500 retrieves a current next hop list of network elements 102B-C for $P_1$ and adds network element 102D to this next hop prefix list. Thus, the next hop list for $P_1$ is:

$P_1$ ❷ 102B, 102C, 102D

Using the next hop list for the prefix, process 500 lookups the next hop list in a next hop list cache, NHList. In one embodiment, NHList is a cache that maps next hops lists to adjacency lists. An adjacency lists can be stored in an adjacency set as described in FIG. 2 above. In this embodiment, computing an adjacency list for a next hop list is an expensive process. This is because resolving a next hop list to an adjacency list uses the routing daemon, which maintains all the routes in RIB (Routing Information Base), published by different routing protocols. When the routing daemon receives a BGP route, this daemon performs an LPM lookup in the RIB for BGP advertised path's destination IP address. If this lookup results in an OSPF IGP route, this BGP route is recursively resolved using OSPF.

In one embodiment, because the recursive resolution of a next hop list to an adjacency list is expensive, the results of a next hop list recursive resolution are cached in a next hop list cache called NHList. The NHList can be used to lookup a next hop list to return a corresponding adjacency list. At block 506, process 500 looks up the next hop list in the NHList cache. The next hop list can be either bigger (e.g., new prefix received) or smaller (e.g., a BGP peer going down). Process 500 determines if there is a match in the NHList at block 508. If there is match, process 500 obtains the adjacency list from NHList at block 512. Execution proceeds to block 514 below. If there is not a match, process 500 performs a recursive resolution for the prefix at block 510. In one embodiment, process 500 performs the recursive resolution for the prefix performs an LPM lookup in the RIB for BGP prefix's destination IP address. The result of the recursive resolution is the adjacency list for this prefix. In addition, process 500 populates the NHList using the adjacency list and next hop list at block 510. Execution proceeds to block 514 below.

At block 514, process 500 updates the adjacency table with the adjacency list for the prefix. In one embodiment, process 500 adds the adjacency set to the adjacency table and adds a reference from the prefix in the LPM to the newly added adjacency set. If the cache lookup yields an adjacency set this is exists in the cache, the adjacency set does not need to be added again. Instead, the prefix references this pre-existing adjacency set. For example and in one embodiment, for prefix $P_1$ with a next hop list of (102B, 102C, 102D) and an adjacency list of (102E, 102F, 102G), process 500 updates the adjacency table with an adjacency set entry of (102E, 102F, 102G), where the prefix $P_1$ references this adjacency entry. In addition, each of the elements in the adjacency set entry of (102E, 102F, 102G) references an entry in the next hop table. By storing the relationship for the next hop list to adjacency list in NHList, the computation time used to compute the adjacency list is saved.

Figure 6:
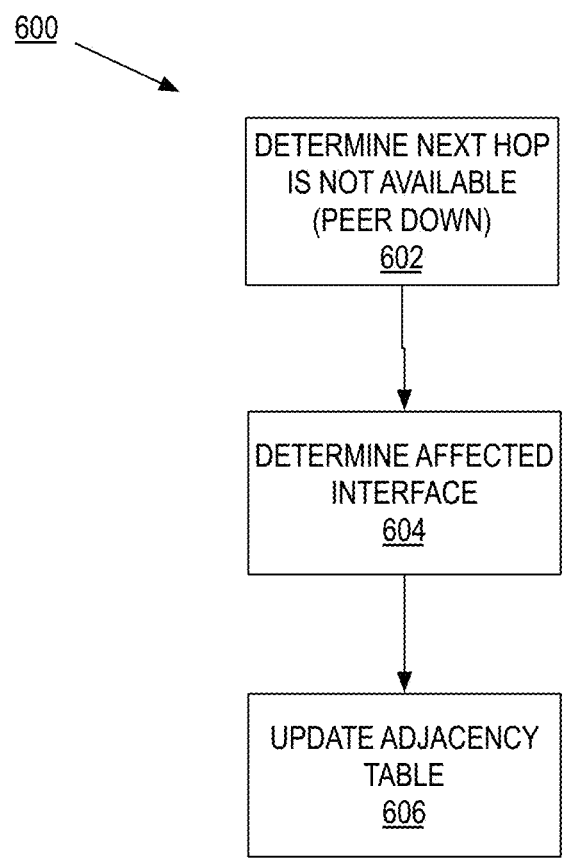
FIG. 6 is a flow diagram of one embodiment of a process to handle a peer node going down.

FIG. 6 is a flow diagram of one embodiment of a process 600 to handle a path to a peer node going down. In one embodiment, process 600 handles the following situations: a directly connected network element going down, an intermediate link going down, and/or BFD or other control plane protocol indicating path to BGP peer is down. In one embodiment, an adjacency module performs process 600 to handle a peer node going down, such as adjacency module 110 as described in FIG. 1 above. In FIG. 6, process 600 begins by determining that a directly connected network element or an intermediate link is down or that a control plane protocol indicates a path to BGP peer is down (e.g., BF at block 602. In one embodiment, process 600 determines a next hop is down because process 600 receives an indication that a peer network element is down. For example and in one embodiment, process 600 determines that a link to one of the BGP peers (e.g., a link to one or more of the network elements 102B-D are down as described in FIG. 3 above). At block 604, process 600 determines which interface is affected by the downed link. In one embodiment, process 600 determines the interface corresponding to the link is down. At block 606, process shrinks the adjacencies, in-place. By shrinking the adjacencies, in-place, process 600 avoids processing the routes. In this embodiment, process 600 walks the adjacencies in adjacency list and shrinks the adjacency, which has this interface. For example and in one embodiment, say the path from 102A to 102D is affected in someway (some link went down or node 102G went down). Process 600 will determine that it is the interface connected to 102G that is affected. In this example, the adjacency set includes network elements (102E, 102F, 102G). Process 600 shrink this adjacency set to include network elements (102E, 102F). This will modify the adjacency table, without modifying the LPM table. Instead, the LPM table entries pointing to the affected adjacency table entry would continue to point to that entry.

Figure 7:
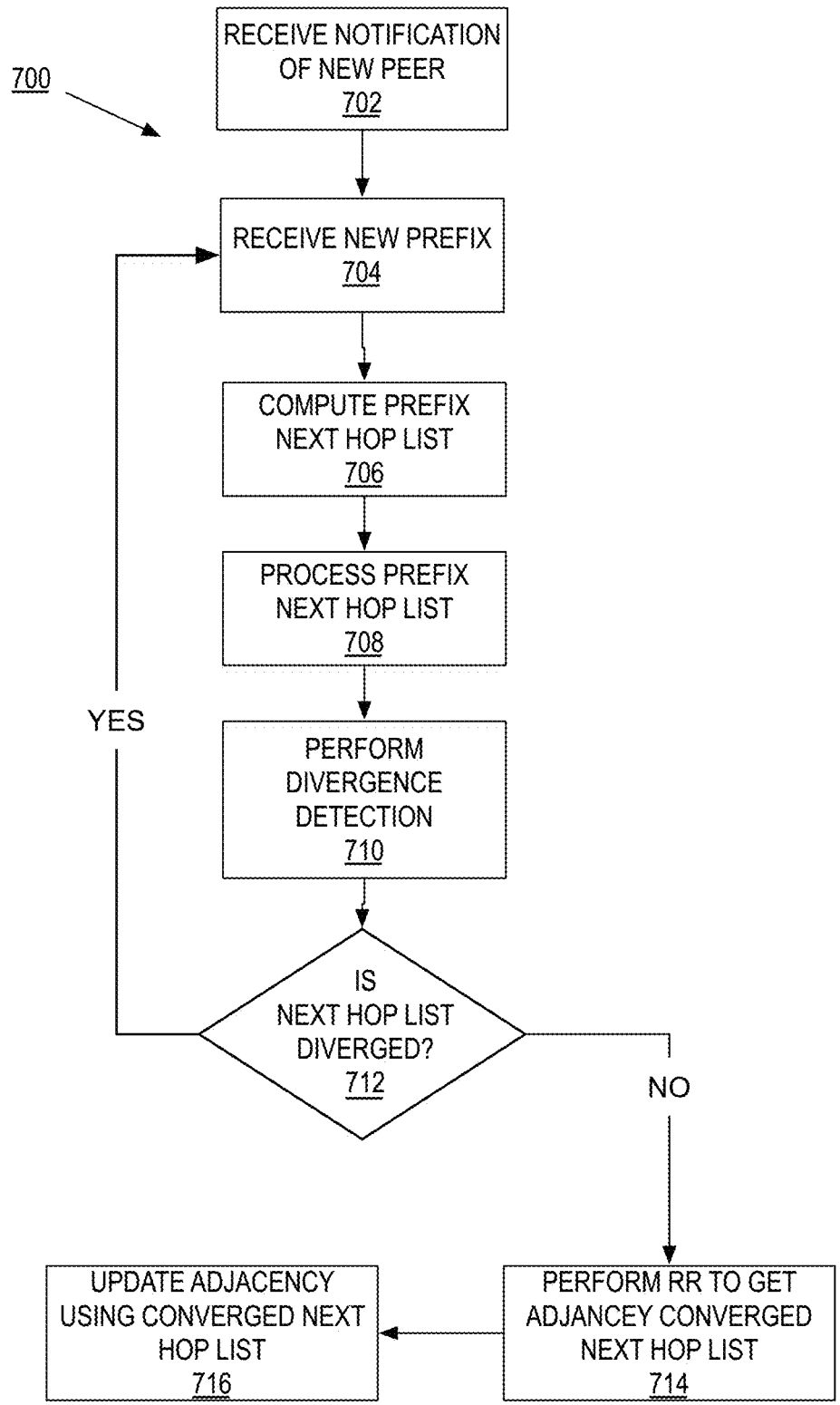
FIG. 7 is a flow diagram of one embodiment of a process to handle a peer node coming up.

As described above, a topology change in the network can also result from a new peer coming up. In one embodiment, instead of updating the FIB for each change due to a new peer coming up, a network element will receive one, some, many new prefix announcements, depending on the number of peers coming at within a particular time frame. In this embodiment, that network element creates a new next hop list for the prefix and processes the new next hop list in a deferred fashion so that the network element can accumulate enough prefix advertisements and batch process these advertisements. FIG. 7 is a flow diagram of one embodiment of a process 700 to handle a peer node coming up. In one embodiment, an adjacency module performs process 700 to handle a peer node coming up, such as adjacency module 110 as described in FIG. 1 above. In FIG. 7, process 700 begins by receiving a notification of a new peer at block 702.

In one embodiment, process 700 receives a new peer notification via a BGP peer notification, a link on an interface, or other mechanism for receive new peer notifications. In one embodiment, a new peer notification is a logical notification, that happens after the two network elements in question have successfully established a peering relationship (e.g., BGP) and are ready to exchange prefixes to each other. Usually both ends are configured to establish this peering relationship. So for this to happen, a pre-requisite is that there is a network connectivity between these network elements. For example and in one embodiment, if network element 102A is performing process 700, process 700 can receive a notification that network elements 102H or 102K (which are peers for network element 102A) are now available as a peer. In this example, these network elements 102H or 102K could become available by being connected to the network, there network elements rebooting, having BGP (or some other protocol that starts peering) being configured, or some other mechanism that starts peering on these network elements. At block 704, process 700 receives a new prefix advertisement. In one embodiment, the new prefix announcement can be a BGP prefix advertisement as described in FIG. 1 above. In another embodiment, process 700 receives the advertisement because a new peer has come up. If the new peer comes up, the peer can advertise a large number prefixes, including one or more prefixes known to the network element performing process 700. Process 700 computes the next hop list for the new prefix at block 706. In one embodiment, process 700 computes the next hop list as described in FIG. 1 above. In one embodiment, instead of immediately updating the adjacency table or the current next hop list cache, process 700 processes the new prefix next hop list in a deferred fashion. In this embodiment, process 700 stows away the prefix next hop list in a queue data structure and schedules the prefix next hop list for later processing. This embodiment can help accumulate enough advertisements from different peers, which can help in eventually leading to the desired final state. Furthermore, deferring the processing reduces the churn in the adjacency table and can lead to faster convergence of the new state of the adjacency table.

At block 708, process 700 processes the received prefix next hop list. As described above and in one embodiment, process 700 processes each of the received prefix next hop lists in a deferred fashion so as to reduce the amount of churn in the adjacency table. In one embodiment, process 700 performs the deferred processing by stowing each of the received prefix next hop lists in a queue data structure and schedules the received prefix next hop lists for later processing. Thus, whenever a new peer comes up and advertises a prefix, the prefix is stowed away in a queue. In one embodiment, at a later time, this queue is processed and the prefix is processed in two stages. The first stage is creating a next hop list for the prefix. In this stage the next hop list is not used to update the FIB. Instead, in stage two, process 700 performs divergence detection and an in-place adjacency replace, if possible. If not, process 700 performs a fallback update.

In one embodiment, and in more detail, process 700 computes the next hop list. In this embodiment, process 700 does not change the route itself yet. Instead, process 700 links the new next hop list entry process 700 found with the old NHLIST (the one that existed prior to this peer publishing this prefix). At the end of this stage, process 700 enqueues the old (existing) NHLIST into another queue feeding second stage operations.

In one embodiment, say, N1 was the old NHLIST (existing) and with the arrival of the new advertisement. In this embodiment, the new advertisement changes the state of the N1 to N2, where N2 results from the act of linking the new NHLIST from the advertisement with N1. For example and in one embodiment, process 700 receives prefix R1, which moves the old NHLIST from N1 to N2. In this example, the NHLIST link state would be like this:

N1→N2(refcount=1)
N2→N1(refcount=1)⇒ reverse mapping

The new NHLIST is linked against the old and vice-versa with respective refcount values being 1. Furthermore, process 700 receives another prefix (R2) that also changes from N1 to N2 (e.g., resulting from a set of protocol next hops that grew by the same fashion as the previous prefix), the state of the linkage for NHLIST would be like this:

N1→N2(refcount=2)
N2→N1(refcount=2)

In addition, process 700 receives another prefix (R3) that move N1 to a different NHLIST N3. The resulting current link state of the NHLIST is:

N1→N2(refcount=2, R1,R2 using this)→N3(anc_refcount=1, R3 using)
N2→N1(refcount=2)
N3→N1(refcount=1)

As illustrated above, the linked list leading from N1 will now have N3 in addition to N2. The refcounts denote how many prefixes have moved to that target NHLIST. The reverse mappings also maintain the counts appropriately.

In a later iteration, process 700 receives another prefix of R2, process 700 would move the next hop link state from N2 to N3. As a result of this move, the linkage is updated as below:

N1→N2(refcount=1, R1 using)→N3(anc_refcount=2, R2,R3 using this)
N2→N1(refcount=1)
N3→N1(refcount=2)

In this example, process 700 has not modified the actual routes R1, R2 and R3 RIB or the adjacencies in the FIB. Instead, the linkages above record how the protocol next hops have transitioned. After receiving the prefixes, process 700 enqueues N1 for the second stage processing.

At block 710, process 700 performs divergence detection on the next hop list, NHLIST. As described above, at the end of the first stage, any NHLIST, which has linkages is enqueued as an input for the second stage divergence detection. In one embodiment, the idea of the divergence detection, is that if prefix next hop list processing is deferred enough for a sufficient time period, the routes from advertised by the new peer would converge to the same destination NHLIST. In one embodiment, the advantage of having a converged NHLIST, is that if the routes converges to a new state for the NHLIST, process 700 can update the adjacencies in-place in the FIB without updating the routing table. For example and in one embodiment, if the three routes from the example above converge to NHLIST N3, and if there are just these routes using the destination NHLIST, process 700 can do an in-place adjacency replace. In one embodiment, the assumption is that since all three routes started with the same source NHLIST (N1), they would share the same adjacency. Thus, if process 700 replaces the adjacency to match what was computed (by recursive-resolution) for the target NHLIST (N3), process 700 could change these three routes with one iteration.

In one embodiment, for this the adjacency replace to work, process 700 would have to ensure that the routes have not diverged first before commencing with the in-place adjacency replace. In this embodiment, process 700 determines if the following invariants have to be satisfied so that there is not a divergence in NHLIST and that an in-place adjacency replace can be performed.

In one embodiment, if a set of routes using one set of NHLIST moves to another NHLIST (e.g., in terms of the above linkages), the desired outcome would be:

N1→N'

Where N1 is the initial NHLIST state and the N' is the final NHLIST state. If there are intermediate NHLIST states (e.g., N2 and N3 described above), one would have N1→N2→N3, where some set of routes are divergent. A set of routes are divergent if these routes started having the same set of BGP next hops (e.g., NHLIST N1) and, after a period of time, there are different subsets of the original set have different NHLISTs (e.g., N2, N3, N4, etc.). If the routes are divergent, process 700 cannot perform in-place adjacency replace.

In one embodiment, for the destination set of NHLISTs (e.g. the set N2, N3), the cardinality of N1 should be 1. The cardinality is the number of NHLISTs attached to the initial NHLIST. For example and in one embodiment, if the initial NHLIST corresponds to the set of routes N and now a subset of those routes are in N1 and another subset of them are in N2, such that,

N→N1→N2.

The cardinality of N is 2 (as it diverged form one NHLIST to two different NHLISTs, N1 and N2). If NHLISTs converges to a final list (e.g., N'), then the set would look like this:

N∝N'

Here cardinality is 1. This means that it has converged (e.g., there is no divergence), provided that the rest of the invariants are satisfied as well. In another example and another embodiment, routes from the source NHLIST, N1, should make the move towards a final NHLIST, say N'. In this embodiment, there cannot have a subset of routes making the transition from N1 to N' with another subset remaining back in N1. Thus, the refcount for N' should match the number of routes currently using N1, which this condition is an invariant for a lack of divergence.

In one embodiment, there cannot be multiple ECMP sets moving into the final N' because

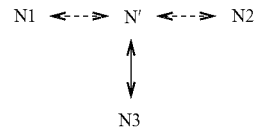

Thus, in this embodiment, the reverse mapping refcount for N' should be 1. The new NHLIST (N') should be erstwhile unused in the system. In other words, it should be newly created. If not, process 700 cannot do an in-place adjacency replace for this. For example and in one embodiment, if the in-place adjacency updates were performed on a divergent set of routes, only a subset of routes would be updated and the rest of the routes would incorrectly point to the old adjacency.

At the end of the second stage, if the prefixes are determined to be not diverged (e.g., it satisfies all the above invariants), process 700 can perform an in-place adjacency replace. If process 700 determines that prefixes have diverged, process 700 defers the processing of these routes some more, with the idea that process 700 will receive further updates from peers, which will lead to the prefixes not being diverged. The deferral can be based on heuristics that are derived from the rate of updates received from peers. For example and in one embodiment, process 700 could keep track of incoming update rate from the newly arrived prefixes. If the incoming rate of update arrivals is above a certain threshold, process 700 could choose to continue to defer. When the incoming rate falls down below the threshold, process 700 can stop deferring. Based on the divergence detection above, process 700 determines if the prefixes have diverged or have converged. If the prefixes have diverged, process 700 moves to block 704 to collect more prefixes so that that these prefixes can converge. If the prefixes are not diverged (e.g., converged), process 700 updates the adjacencies using the converged next hop list, N' with in-place adjacency replacement, at block 714. In one embodiment, process 700 performs an in-place adjacency replacement by looking up the NHLIST-cache for the initial NHLIST (N) and obtaining the adjacency (e.g., performing block 512 of process 500). Lets calls this result, adjacency A1. Using the new NHLIST (N'), which is in the cardinality set described above, process 700 computes the new adjacency using recursive resolution (e.g., block 510 of process 500). Lets call the second result, adjacency A2. Process 700 further copies the contents of A2 above into A1 and updates A1 in-place. Thus, all prefixes pointing to A1 would continue to point to A1 and would now inherit the new adjacency list (from contents of A2).

Figure 8:
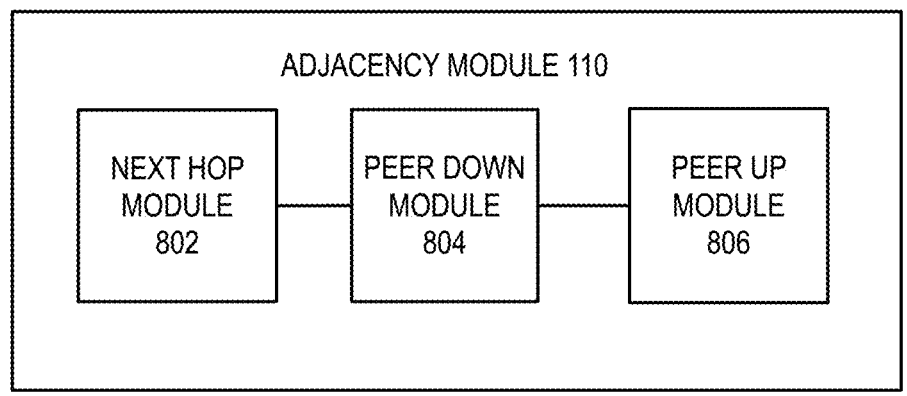
FIG. 8 is a block diagram of one embodiment of an adjacency module that handles adjacency changes.

FIG. 8 is a block diagram of one embodiment of an adjacency module 110 that handles adjacency changes. In one embodiment, the adjacency module 110 includes a next hop module 802, a peer down module 804, and a peer up module 806. In one embodiment, the a next hop module 802 adds new adjacency to the adjacency table as described in FIG. 5 above. The peer down module 804 handles a peer node going down as described in FIG. 6 above. The peer up module 806 handles a peer node coming up as described in FIG. 7 above.

Figure 9:
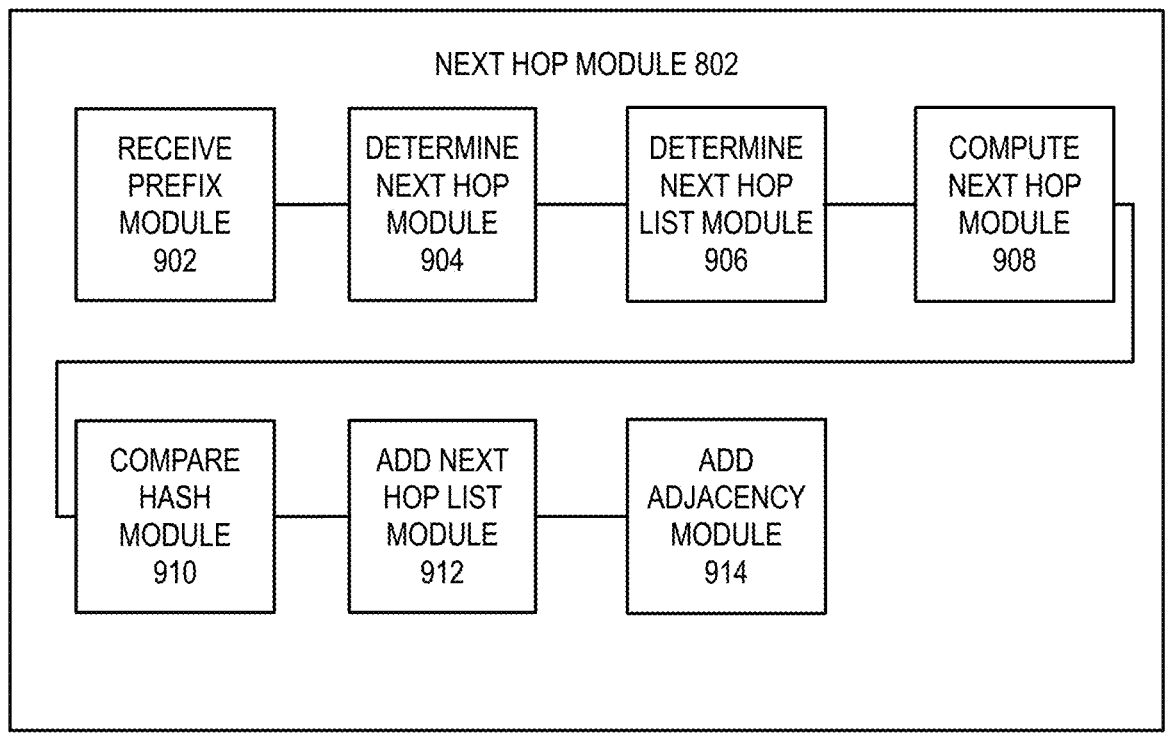
FIG. 9 is a block diagram of one embodiment of a next hop module that adds new equal cost path to an adjacency table.

FIG. 9 is a block diagram of one embodiment of a next hop module 802 that adds new adjacency to an adjacency table. In one embodiment, the next hop module 802 includes a receive prefix module 902, determine next hop module 904, determine next hop list module 906, compute next hop hash 908, compare hash module 910, add next hop list module 912, and add adjacency module 914. In one embodiment, the receive prefix module 902 receives a prefix as described in FIG. 5, block 502 above. The determine next hop module 904 determines the next hop(s) for the prefix as described in FIG. 5, block 504 above. The determine next hop list module 906 determines the next hop list for the prefix as described in FIG. 5, block 506 above. The compute next hop hash 908 computes a hash for the next hop list as described in FIG. 5, block 508 above. The compare hash module 910 compares the hash in a lookup table as described in FIG. 5, block 510 above. The add next hop list module 912 creates a new next hop list entry for that prefix in the next hop list cache as described in FIG. 5, block 512 above. The add prefix module 914 updates the next hop list cache as described in FIG. 5, block 512 above.

Figure 10:
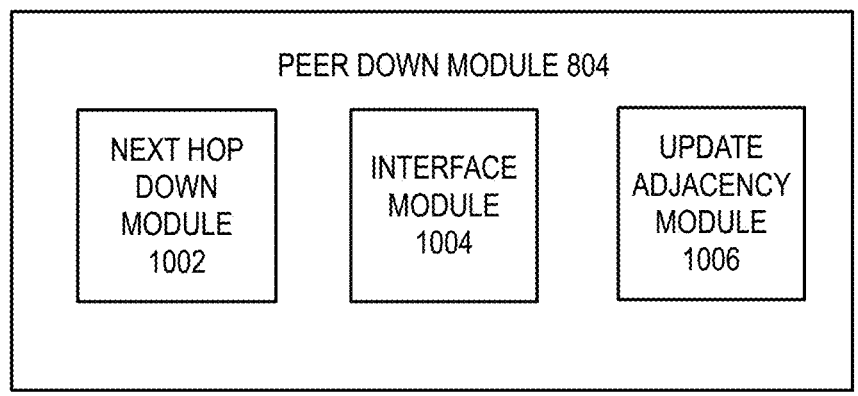
FIG. 10 is a block diagram of one embodiment of a peer down module that handles a peer node going down.

FIG. 10 is a block diagram of one embodiment of a peer down module 804 that handles a peer node going down. In one embodiment, the peer down module 804 includes a next hop down module 1002, interface module 1004, and update adjacency module 1004. In one embodiment, the next hop down module 1002 determines that a next hop is down as described in FIG. 6, block 602 above. The interface module 1004 determines which interface is associated with the down next hop as described in FIG. 6, block 604 above. The update adjacency module updates the adjacencies as described in FIG. 6, block 606 above.

Figure 11:
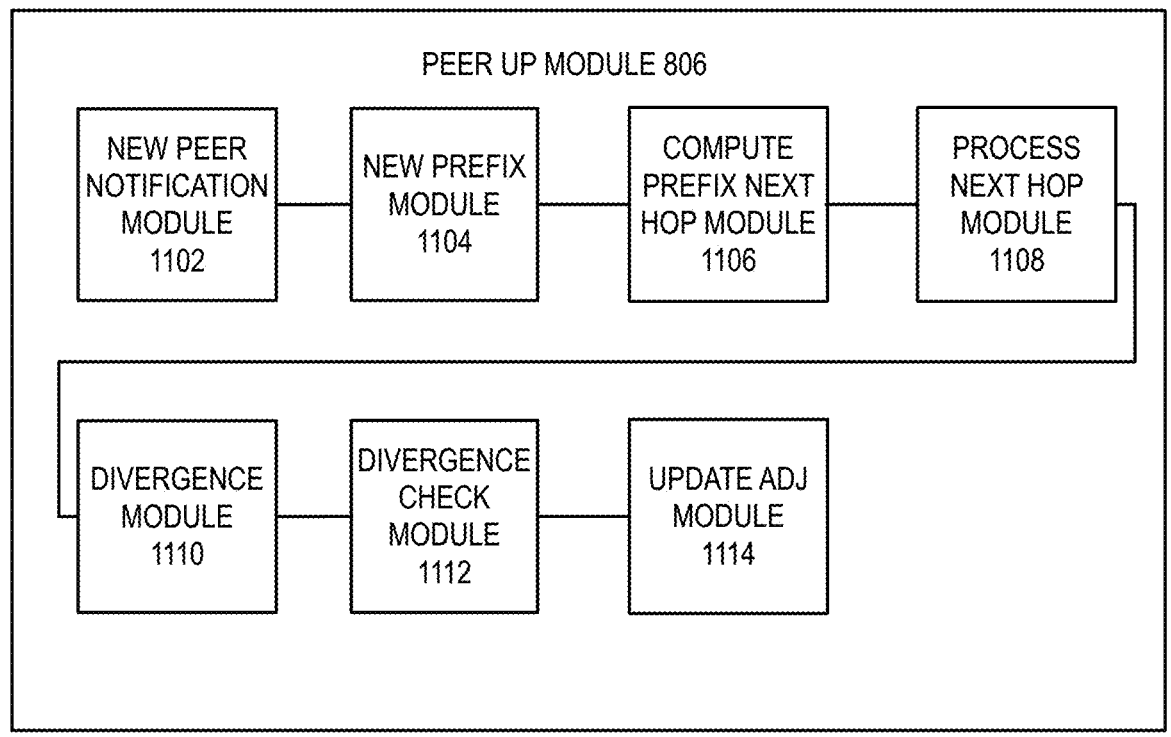
FIG. 11 is a block diagram of one embodiment of a peer up module that handles a peer node coming up.

FIG. 11 is a block diagram of one embodiment of a peer up module 806 that handles a peer node coming up. In one embodiment, the peer up module 806 includes a new peer notification module 1102, new prefix module 1104, compute prefix next hop list module 1106, process next hop list module 1108, divergence module 1110, divergence check module 1112, and update adjacency module 1114. In one embodiment, the new peer notification module 1102 receives a new peer notification as described in FIG. 7, block 702 above. The new prefix module 1104 receives a new prefix from this peer as described in FIG. 7, block 704 above. The compute prefix next hop list module 1106 computes the prefix next hop list as described in FIG. 7, block 706 above. The process next hop list module 1108 processes the next hop list as described in FIG. 7, block 708 above. The divergence module 1110 computes the divergence as described in FIG. 7, block 710 above. The divergence check module 1112 checks the divergence as described in FIG. 7, block 712 above. The update adjacency module 1114 performs the in-place adjacency replacement as described in FIG. 7, block 714 above.

Figure 12:
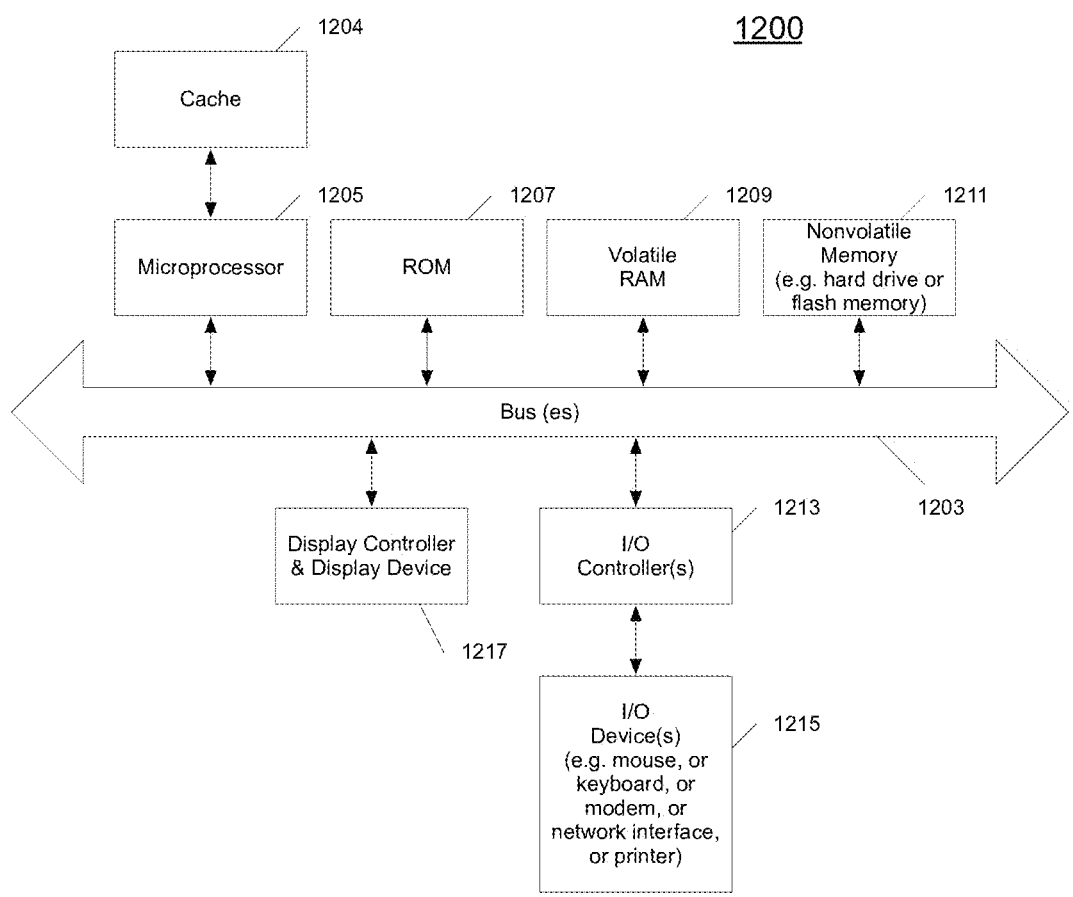
FIG. 12 illustrates one example of a typical computer system, which may be used in conjunction with the embodiments described herein.

FIG. 12 shows one example of a data processing system 1200, which may be used with one embodiment of the present invention. For example, the system 1200 may be implemented including a network element 102A as shown in FIG. 1. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1217 and to peripheral devices such as input/output (I/O) devices which may be mice, keyboards, modems, network interfaces, printers and other devices which are well known in the art. In one embodiment, the system 1200 includes a plurality of network interfaces of the same or different type (e.g., Ethernet copper interface, Ethernet fiber interfaces, wireless, and/or other types of network interfaces). In this embodiment, the system 1200 can include a forwarding engine to forward network date received on one interface out another interface.

Typically, the input/output devices 1215 are coupled to the system through input/output controllers 1213. The volatile RAM (Random Access Memory) 1209 is typically implemented as dynamic RAM (DRAM), which requires power continually in order to refresh or maintain the data in the memory.

The mass storage 1211 is typically a magnetic hard drive or a magnetic optical drive or an optical drive or a DVD ROM/RAM or a flash memory or other types of memory systems, which maintains data (e.g. large amounts of data)

even after power is removed from the system. Typically, the mass storage 1211 will also be a random access memory although this is not required. While FIG. 11 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 13:
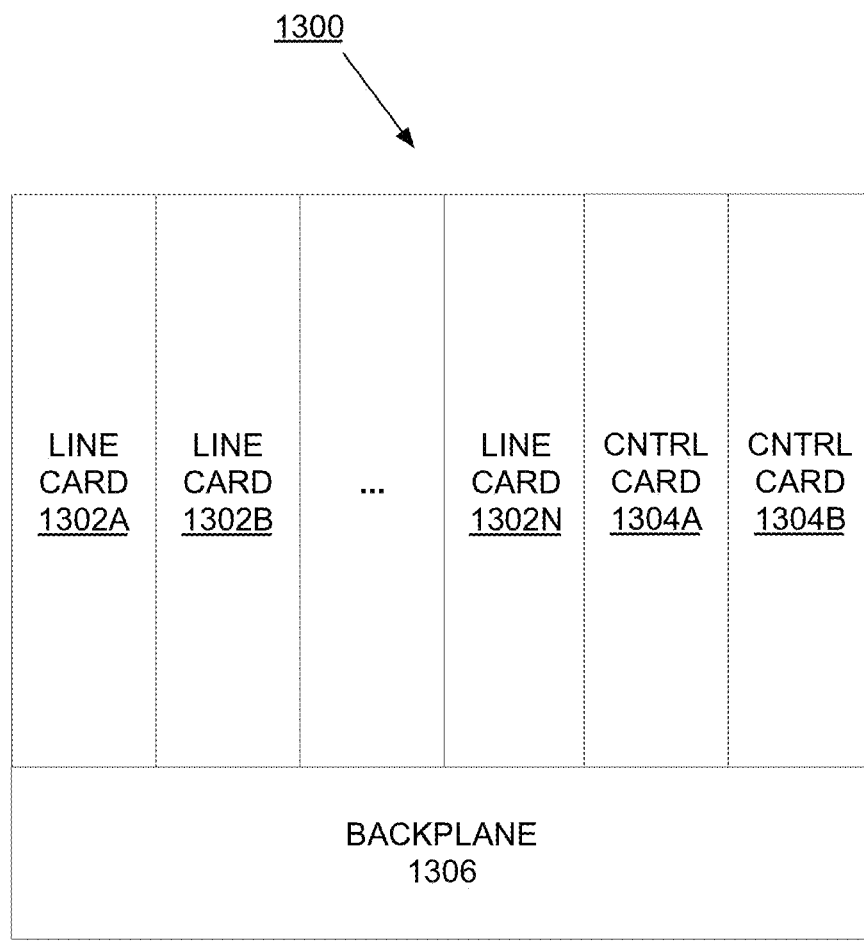
FIG. 13 is a block diagram of one embodiment of an exemplary network element that processes changes to forwarding information.

FIG. 13 is a block diagram of one embodiment of an exemplary network element 1300 that processes changes to forwarding information. In FIG. 13, the backplane 1306 couples to the line cards 1302A-N and controller cards 1304A-B. While in one embodiment, the controller cards 1304A-B control the processing of the traffic by the line cards 1302A-N, in alternate embodiments, the controller cards 1304A-B, perform the same and/or different functions (e.g., processes changes to forwarding information, etc.). In one embodiment, the line cards 1302A-N process and forward traffic according to the network policies received from controller cards the 1304A-B. In this embodiment, one, some, or all of the controller cards 1304A-B includes the adjacency module to process changes to forwarding information in this network element 1300, such as the adjacency module 110 as described in FIG. 1 above. It should be understood that the architecture of the network element 1300 illustrated in FIG. 13 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "performing," "computing," "adding," "deleting," "storing," "recording," "updating," "linking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process changes to forwarding information of a network element in a network, the method comprising:
- receiving an indication of a change to a network topology of the network, wherein the forwarding information includes a first plurality of prefixes and a plurality of adjacencies and each of the first plurality of prefixes references one of the plurality of adjacencies;
- in response to receiving the indication of the change to the network topology, identifying a change to the plurality of adjacencies; and
- updating the plurality of adjacencies in-place with the change to the plurality of adjacencies;
- wherein the change in the network topology is a peer up, and the in-place updating of the plurality of adjacencies comprises:
- receiving a notification of a new peer;
- receiving a second plurality of prefixes;
- computing a second next hop list from each of the plurality of prefixes;
- performing divergence detection between the second next hop list and a first next hop list computed from the first plurality of prefixes; and
- if the first and second next hop lists are not diverged, updating the plurality of adjacencies in-place.

2. The non-transitory machine-readable medium of claim 1, wherein the in-place updating of the plurality of adjacencies further comprises:
- if the first and second next hop lists are diverged, receiving a third plurality of prefixes.

3. The non-transitory machine-readable medium of claim 1, wherein the computing a second next hop list from each of the plurality of prefixes comprises:
- computing a third next hop list from the second plurality of prefixes; and
- linking the third next list to the first next hop list.

4. The non-transitory machine-readable medium of claim 1, wherein the first and second next hop lists are not diverged if a reference count for the third hop list is equal to the number of routes using the first next hop list.

5. The non-transitory machine-readable medium of claim 1, wherein the performing the divergence detection comprises:
- determining if the first next hop list has different subsets of next hops.

6. A method to process changes to forwarding information of a network element in a network, the method comprising:
- receiving an indication of a change to a network topology of the network, wherein the forwarding information includes a first plurality of prefixes and a plurality of adjacencies and each of the first plurality of prefixes references one of the plurality of adjacencies;
- in response to receiving the indication of the change to the network topology, identifying a change to the plurality of adjacencies; and
- updating the plurality of adjacencies in-place with the change to the plurality of adjacencies;
- wherein the change in the network topology is a peer up, and the in-place updating of the plurality of adjacencies comprises:
- receiving a notification of a new peer;
- receiving a second plurality of prefixes;
- computing a second next hop list from each of the plurality of prefixes;
- performing divergence detection between the second next hop list and a first next hop list computed from the first plurality of prefixes; and
- if the first and second next hop lists are not diverged, updating the plurality of adjacencies in-place.

7. The method of claim 6, wherein the first and second next hop lists are not diverged if a reference count for the third hop list is equal to the number of routes using the first next hop list.

8. The method of claim 6, wherein the performing the divergence detection comprises:
- determining if the first next hop list has different subsets of next hops.

* * * * *